United States Patent
Fairgrieve et al.

(10) Patent No.: US 10,399,566 B2
(45) Date of Patent: Sep. 3, 2019

(54) SPEED CONTROL SYSTEM AND METHOD FOR OPERATING THE SAME

(71) Applicant: Jaguar Land Rover Limited, Whitley, Coventry, Warwickshire (GB)

(72) Inventors: Andrew Fairgrieve, Rugby (GB); James Kelly, Solihull (GB); Daniel Woolliscroft, Birmingham (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 194 days.

(21) Appl. No.: 14/421,865

(22) PCT Filed: Aug. 13, 2013

(86) PCT No.: PCT/EP2013/066907
§ 371 (c)(1),
(2) Date: Feb. 16, 2015

(87) PCT Pub. No.: WO2014/026986
PCT Pub. Date: Feb. 20, 2014

(65) Prior Publication Data
US 2015/0210282 A1  Jul. 30, 2015

(30) Foreign Application Priority Data

Aug. 16, 2012 (GB) .................................. 1214651.0
Mar. 14, 2013 (GB) .................................. 1304653.7

(51) Int. Cl.
*B60W 30/14* (2006.01)
*B60T 8/175* (2006.01)
(Continued)

(52) U.S. Cl.
CPC ........... *B60W 30/143* (2013.01); *B60T 8/175* (2013.01); *B60W 30/146* (2013.01);
(Continued)

(58) Field of Classification Search
CPC .. B60W 30/14; B60W 30/143; B60W 30/146; B60W 30/18; B60W 30/184;
(Continued)

(56) References Cited

U.S. PATENT DOCUMENTS 7,099,757 B2 * 8/2006 Niki ......................... B60K 6/48
701/22
8,973,691 B2 * 3/2015 Morgan ................... B60K 1/00
180/68.5
(Continued)

FOREIGN PATENT DOCUMENTS

DE      19914428 C1   11/2000
EP      1394394 A2    3/2004

OTHER PUBLICATIONS

Kim et al., Control of Integrated Powertrain with Electronic Throtle and Automatic Transmission, May 2007, IEEE, Figure 2.*
(Continued)

*Primary Examiner* — Thomas G Black
*Assistant Examiner* — Sara J Lewandroski
(74) *Attorney, Agent, or Firm* — Reising Ethington P.C.

(57) ABSTRACT

A method for operating a speed control system of a vehicle is provided. The method comprises identifying a torque required to achieve a desired operating parameter of the vehicle. The method further assessing whether the required torque exceeds a predetermined torque limit, and when it does, determining if it is appropriate to increase the torque limit. When it is determined that it is appropriate to do so, the method further comprises increasing the predetermined torque limit. A speed control system of a vehicle comprising an electronic control unit configured to: determine a torque required to achieve a desired operating parameter of the vehicle, assess whether the required torque exceeds a predetermined torque limit; when the torque exceeds the torque limit, determine if it is appropriate to increase the torque
(Continued)

limit; and when it is determined that it is appropriate to do so, increase the torque limit, is also provided.

20 Claims, 7 Drawing Sheets

(51) Int. Cl.
F16H 61/02 (2006.01)
B60W 30/18 (2012.01)
F16H 59/66 (2006.01)

(52) U.S. Cl.
CPC ... *B60W 30/18172* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2550/141* (2013.01); *B60W 2720/10* (2013.01); *B60W 2720/12* (2013.01); *B60W 2720/30* (2013.01); *B60Y 2200/20* (2013.01); *F16H 59/66* (2013.01); *F16H 2061/0234* (2013.01)

(58) Field of Classification Search
CPC ............. B60W 30/188; B60W 30/162; B60W 50/038; B60W 2510/0657; B60W 2510/08; B60W 2710/0666; B60W 2710/083; B60W 2300/185; F16H 61/0204; F16H 61/0213; B60K 2310/00; B60K 2310/24; B60K 2310/242; B60K 2310/244; B60K 2310/30
USPC .......................................................... 701/93
See application file for complete search history.

(56) References Cited

U.S. PATENT DOCUMENTS

| | | | | |
|---|---|---|---|---|
| 2002/0128762 A1* | 9/2002 | Noguchi | ............. | B60R 16/0373 701/51 |
| 2004/0129251 A1* | 7/2004 | Kang | ............. | F16H 61/66 123/396 |
| 2005/0026747 A1* | 2/2005 | Steen | ............. | B60W 10/06 477/78 |
| 2005/0075773 A1* | 4/2005 | Schweizer | ............. | B60W 10/02 701/51 |
| 2006/0116806 A1* | 6/2006 | Steen | ............. | B60W 10/06 701/51 |
| 2007/0028892 A1* | 2/2007 | Schmid | ............. | B60W 10/30 123/352 |
| 2008/0189021 A1* | 8/2008 | Inoue | ............. | B60K 31/047 701/93 |
| 2008/0228362 A1* | 9/2008 | Muller | ............. | B60W 10/06 701/54 |
| 2009/0005945 A1* | 1/2009 | Takeda | ............. | B60T 7/22 701/70 |
| 2009/0069993 A1* | 3/2009 | Inoue | ............. | B60W 40/06 701/70 |
| 2009/0076699 A1 | 3/2009 | Osaki et al. | | |
| 2009/0107747 A1* | 4/2009 | Luehrsen | ............. | B60T 8/175 180/197 |
| 2009/0164081 A1* | 6/2009 | Meloche | ............. | B60W 30/1882 701/94 |
| 2010/0191435 A1 | 7/2010 | Okamura et al. | | |
| 2010/0286886 A1* | 11/2010 | O'leary | ............. | B60W 10/06 701/93 |
| 2011/0106388 A1* | 5/2011 | Boeckenhoff | ............. | B60W 10/06 701/70 |
| 2011/0246042 A1* | 10/2011 | Tomokuni | ............. | B60W 30/143 701/93 |
| 2011/0320102 A1* | 12/2011 | Ohbayashi | ............. | B60K 31/047 701/93 |
| 2012/0136548 A1* | 5/2012 | Hoff | ............. | B60W 10/06 701/93 |
| 2013/0030667 A1* | 1/2013 | Fujimoto | ............. | B60W 10/06 701/93 |
| 2013/0226420 A1* | 8/2013 | Pedlar | ............. | B60K 31/047 701/67 |
| 2014/0244084 A1* | 8/2014 | Raftry | ............. | B60W 10/02 701/22 |
| 2015/0134224 A1* | 5/2015 | Vaughan | ............. | B60W 10/06 701/93 |
| 2015/0151758 A1* | 6/2015 | Yoshino | ............. | F02D 11/106 701/54 |
| 2015/0210281 A1* | 7/2015 | Johansson | ............. | B60W 50/0097 701/94 |
| 2015/0224992 A1* | 8/2015 | Dornieden | ............. | B60W 30/143 701/1 |

OTHER PUBLICATIONS

International Search Report for application No. PCT/EP2013/066907, dated Oct. 15, 2013, 3 pages.
UK Combined Search and Examination Report for corresponding application No. GB1304653.7, dated Aug. 27, 2013, 5 pages.
Written Opinion for application No. PCT/EP2013/066907, dated Oct. 15, 2013, 6 pages.

\* cited by examiner

SPEED CONTROL SYSTEM AND METHOD FOR OPERATING THE SAME

TECHNICAL FIELD

The present disclosure relates generally to vehicle speed control systems, and more particularly, speed control systems in which a predetermined torque limit is imposed when the system is in use.

BACKGROUND

It is known that vehicles may be equipped with speed control systems, such as, for example, on-road cruise control systems, that allow a user to define a desired set-speed and then maintain the speed of the vehicle at that particular set-speed. In very simplistic terms, this may be accomplished by sending commands to the powertrain and/or braking subsystems of the vehicle, for example. While such systems have any number of benefits ranging from wear on the vehicle to driver comfort, they are not without their drawbacks or disadvantages.

For example, one drawback of conventional systems is that they often have an operational limit as it relates to the amount of powertrain output torque that the system may command or request from the powertrain subsystem when the system is active or in use. More particularly, when the speed control system is in use, a default maximum torque limit is established, which is typically a fixed proportion of the maximum torque capacity of the powertrain subsystem, and the speed control system is not permitted to request or command torque that exceeds this torque limit. At least one reason for imposing such a limit is to ensure compliance with specific regulations concerning the use of speed control systems on the road, and the rate of acceleration that the speed control systems may command during operation on the road. However, these artificially imposed torque limits may limit off-road capability of the vehicle, and the speed control system, in particular.

Accordingly, there is a need for a speed control system and a method for use with the same that minimizes and/or eliminates one or more of the above-identified deficiencies.

SUMMARY

According to an embodiment, there is provided a method for operating a speed control system of a vehicle. The method comprises: identifying a torque required (required torque) to achieve a desired operating parameter of the vehicle; assessing whether the torque exceeds a predetermined torque limit of the speed control system; when the torque exceeds the predetermined torque limit, determining if it is appropriate to increase the predetermined torque limit; and when it is determined that it is appropriate to do so, increasing the predetermined torque limit.

According to another embodiment, there is provided a method for operating a speed control system of a vehicle. The method comprises: identifying a torque required (required torque) to achieve a desired operating parameter of the vehicle; assessing whether the torque exceeds a predetermined torque limit of the speed control system; when the torque exceeds the predetermined torque limit, determining if it is appropriate to increase the predetermined torque limit by evaluating one or more criteria, and when at least certain of the one or more criteria are met, determination that it is appropriate to increase the torque limit; and when it is determined that it is appropriate to do so, increasing the predetermined torque limit.

According to yet another embodiment, there is provided a method for operating a speed control system. The method comprises: monitoring the speed and powertrain output torque of the vehicle; when the speed of the vehicle falls below a desired speed, and the powertrain output torque has met a predetermined torque limit of the speed control system, determining if it is appropriate for the output torque to exceed the predetermined torque limit; and when it is determined that it is appropriate to do so, increasing the powertrain output torque to a level at which the desired vehicle speed is achieved.

According to a further embodiment, there is a provided a speed control system. The system comprises an electronic control unit that is configured to determine a torque required to achieve a desired operating parameter of the vehicle. The electronic control unit is further configured to assess whether the torque exceeds a predetermined torque limit that the speed control system may command, and when the torque exceeds the predetermined torque limit, to determine if it is appropriate to increase the predetermined torque limit. When it is determined that it is appropriate to increase the torque limit, the electronic control unit is still further configured to do so.

DESCRIPTION OF THE DRAWINGS

One or more embodiments of the invention will now be described, by way of example only, with reference to the following figures in which.

DETAILED DESCRIPTION

The method and system described herein may be used to control various operating parameters of a vehicle, such as, for example, powertrain output torque and speed. In one embodiment, the present method and system identify a powertrain output torque required to achieve a desired operating parameter (e.g., desired speed) of a vehicle and to determine if the identified torque exceeds a predetermined powertrain output torque limit. If it is determined that the identified torque exceeds the limit, the system and method determine whether it is appropriate, based on one or more conditions/criteria, to temporarily increase the torque limit, and if so, to then increase the torque limit in order to achieve the desired operating parameter.

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present disclosure.

Figure 1:
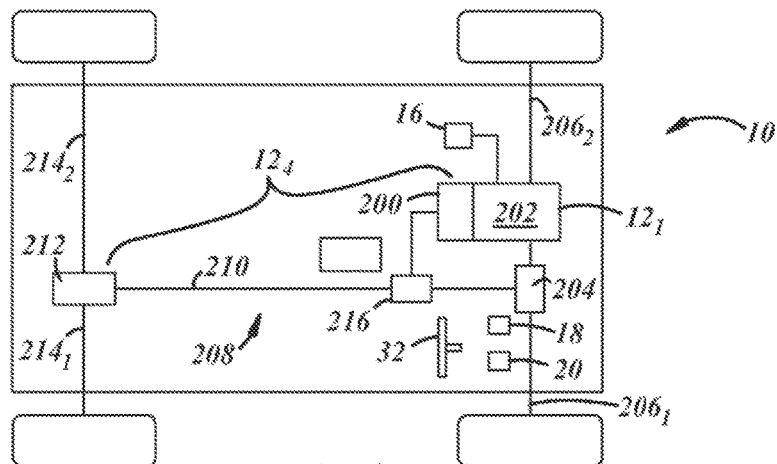
FIG. 1 is a schematic and block diagram of a vehicle.
Figure 2:
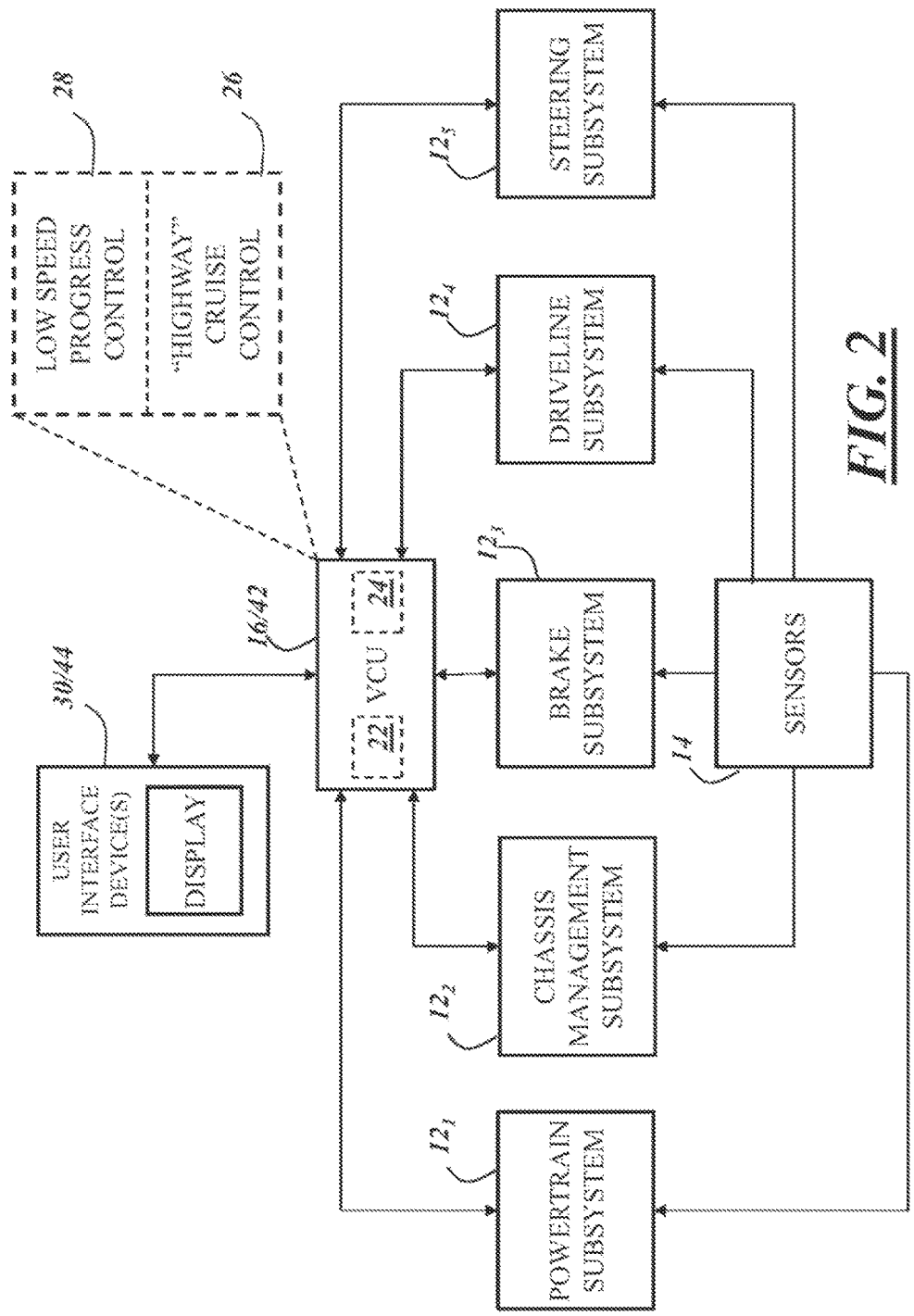
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 16 (VCU 16), among any number of other components, systems, and/or devices not illustrated or otherwise described herein.

Subsystems 12 of vehicle 10 may be configured to perform or control various functions and operations relating to vehicle 10 and, as illustrated in FIG. 2, may include any number of subsystems 12. One such subsystem is a powertrain subsystem $12_1$. As is well known in the art, powertrain subsystem $12_1$ is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In one embodiment, however, the maximum output capacity of powertrain subsystem $12_1$ of vehicle 10 may be in the order of 600 Nm. As is known in the art, powertrain output torque may be measured using one or more of vehicle sensors 14 described below (e.g., an engine torque sensor or a driveline torque sensor) or other suitable sensing means and may be used for a variety of purposes by one or more components, modules, or subsystems of vehicle 10, in addition to powertrain subsystem $12_1$, including, for example and without limitation, one or more of those described below. Those having ordinary skill in the art will appreciate that powertrain subsystem $12_1$ may be provided according to any number of different embodiments, may be connected in any number of different configurations, and may include any number of different components, like output torque sensors, control units, and/or any other suitable components known in the art. Accordingly, the present disclosure is not limited to any one particular powertrain subsystem.

Vehicle 10 may also include a chassis control or management subsystem $12_2$. Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described or identified herein. For example, subsystem $12_2$ may be configured to receive readings or other information relating to the pressure of the tyres of the vehicle from, for example, tyre pressure sensors associated with each tyre. As such, chassis management subsystem $12_2$ may monitor the tyre pressure and, if necessary, and if the vehicle is so configured, to automatically make, or cause to be made, adjustments to the pressure using an air compressor onboard the vehicle. Similarly, chassis management system $12_2$ may also be configured to receive readings or other information relating to the ride height of the vehicle from, for example, one or more air suspension sensors that may be distributed about the vehicle. In such an instance, chassis management subsystem $12_2$ may monitor the ride height of the vehicle and, if necessary, and if the vehicle is so configured, to automatically make, or cause to be made, adjustments to the ride height using and air compressor (suspension compressor) onboard the vehicle. Chassis management subsystem $12_2$ may further be configured to monitor the attitude of the vehicle. More particularly, subsystem $12_2$ may receive readings or information from one or more of sensors 14 and/or subsystems 12 described or identified herein to evaluate the pitch, roll, and yaw of the vehicle, and therefore, the overall attitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, it will be appreciated that subsystem $12_2$ may be configured to control and/or monitor any number of other or additional parameters/aspects of vehicle 10 in the same or similar manner as that described above. As such, the present disclosure is not limited to the control and/or monitoring of any particular parameters/aspects. Moreover, it will be further appreciated that chassis management subsystem $12_2$ may be provided according to any number of different embodiments and may include any number of different components, like sensors, control units, and/or any other suitable components known in the art. Accordingly, the present disclosure is not limited to any one particular chassis management subsystem Yet another example of subsystem of vehicle 10 is a driveline subsystem $12_4$. As is known in the art, and as is illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer box 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present disclosure is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this disclosure, each of the aforementioned subsystems 12, and the functionality corresponding thereto, is conventional in the art. As such, detailed descriptions will not be provided; rather, the structure and function of each identified subsystem 12 will be readily apparent to those having ordinary skill in the art.

In any event, in one embodiment, one or more of subsystems 12 may be under at least a certain degree of control by VCU 16. In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem $12_1$ as an example, powertrain subsystem $12_1$ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed has been requested via a brake pedal (pedal 18 in FIG. 1) or accelerator pedal (pedal 20 in FIG. 1) of vehicle 10). While the description above has been with particular reference to powertrain subsystem $12_1$, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present disclosure.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to the operation and configuration of vehicle 10, and may include, for example and without limitation, any one or more of: wheel speed sensors; ambient temperature sensors; atmospheric pressure sensors; tyre pressure sensors; gyro sensors to detect yaw, roll, and pitch of the vehicle; vehicle speed sensors; a longitudinal acceleration sensor; an engine torque sensor; a driveline torque sensor; a throttle valve sensor; a steering angle sensor; a steering wheel speed sensors; a gradient sensor; a lateral acceleration sensor on the stability control system (SCS); a brake pedal position sensor; brake pedal pressure sensor; an accelerator pedal position sensor; air suspension sensors (i.e., ride height sensors); wheel position sensors; water detection sensors (for both proximity and depth of wading events); a transfer case HI-LO ratio sensor; an air intake path sensor; and longitudinal, lateral, and vertical motion sensors, among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art. Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangement(s), but rather any suitable embodiment may be used.

VCU 16 may comprise any suitable ECU, and may include any variety of electronic process devices, memory devices, input/output (I/O) devices, and/or other known components, and perform various control and/or communication related functions. In one embodiment, VCU 16 includes an electronic memory device 22 that may store various sensor readings (e.g., such as those generated by vehicle sensors 14), look-up tables or other data structures, algorithms (e.g., the algorithms embodied in the method described below), etc. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a standalone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 28.

On-highway cruise control system 26, which may comprise any number of conventional cruise control systems known in the art, is operable to automatically maintain vehicle speed at a desired "set-speed" set by the user. Such systems are generally limited in their use in that the vehicle must be traveling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem $12_1$), or for example, VCU 16 (as is illustrated in FIG. 2).

Figure 3:
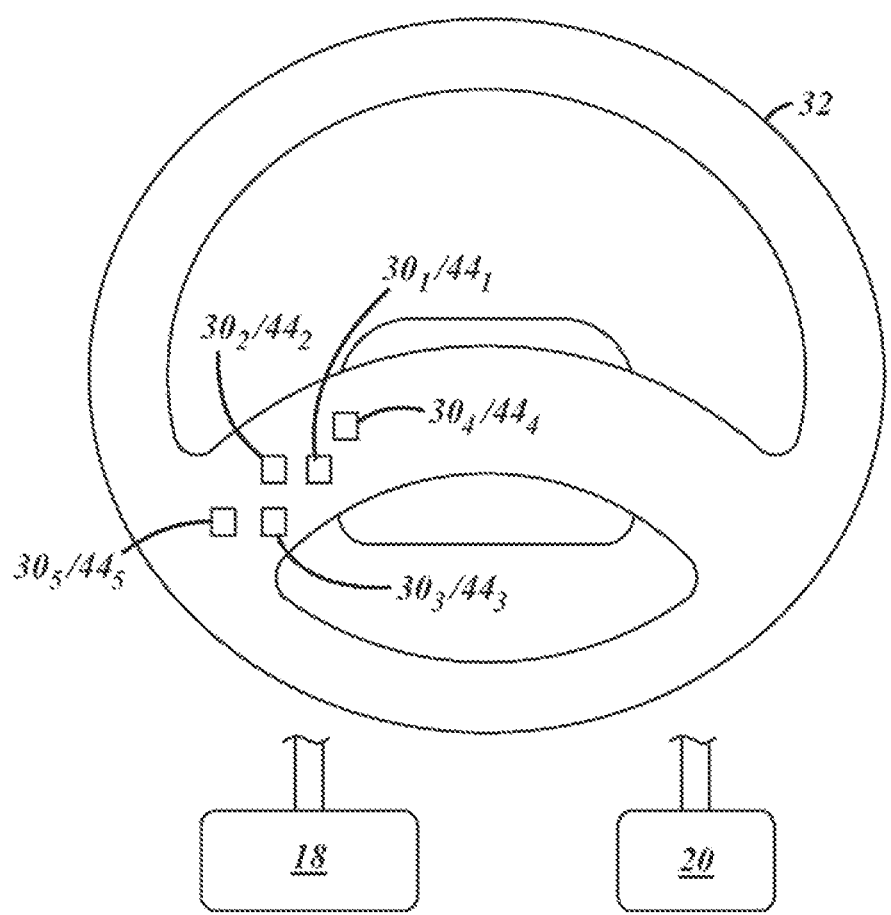
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button $30_1$ that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph, or 1 kph, for example, for vehicles with speed displayed in metric units), and a "−" button $30_3$ to allow the user to decrease the set-speed in the same discrete increments. Alternatively, the "+" and "−" buttons $30_2$, $30_3$ may be integrated into a single user-selectable device. Additional user-selectable interface devices of system 26 may include, for example, a "cancel" button $30_4$ to deactivate or suspend the system, as well as a "resume" button $30_5$ to allow for the system to be re-activated following a temporary suspension or deactivation of the system function.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 28, the vehicle need not be traveling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the cruise control function is cancelled and the vehicle reverts to a manual mode of operation requiring user pedal input to maintain vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least one embodiment, it is configured in such a way that the speed control function provided thereby is not cancelled or deactivated in response to those events described above.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: determining characteristics of the terrain over which vehicle 10 is traveling; determining a powertrain output torque limit imposed when system 28 is in use and evaluating whether a requested torque exceeds that torque limit; determining whether the torque limit of system 28 should be temporarily increased when the requested torque exceeds the limit; etc. Further, in one embodiment. ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, sensor readings, look-up tables or other data structures, algorithms, software, and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). In one embodiment, user interface devices 30, 44 of on-highway cruise control system 26 and LSP control system 28, respectively, are arranged adjacent to one another within vehicle 10, and, in one embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively or individually, to either achieve or maintain the vehicle at the desired set-speed. In one embodiment, this may comprise VCU 16 generating and sending appropriate commands to the appropriate subsystems 12 (such as powertrain subsystem $12_1$ and brake subsystem $12_3$), for example, and/or directly controlling the operation of one or more components, modules, subsystems, etc. of vehicle 10.

Figure 4:
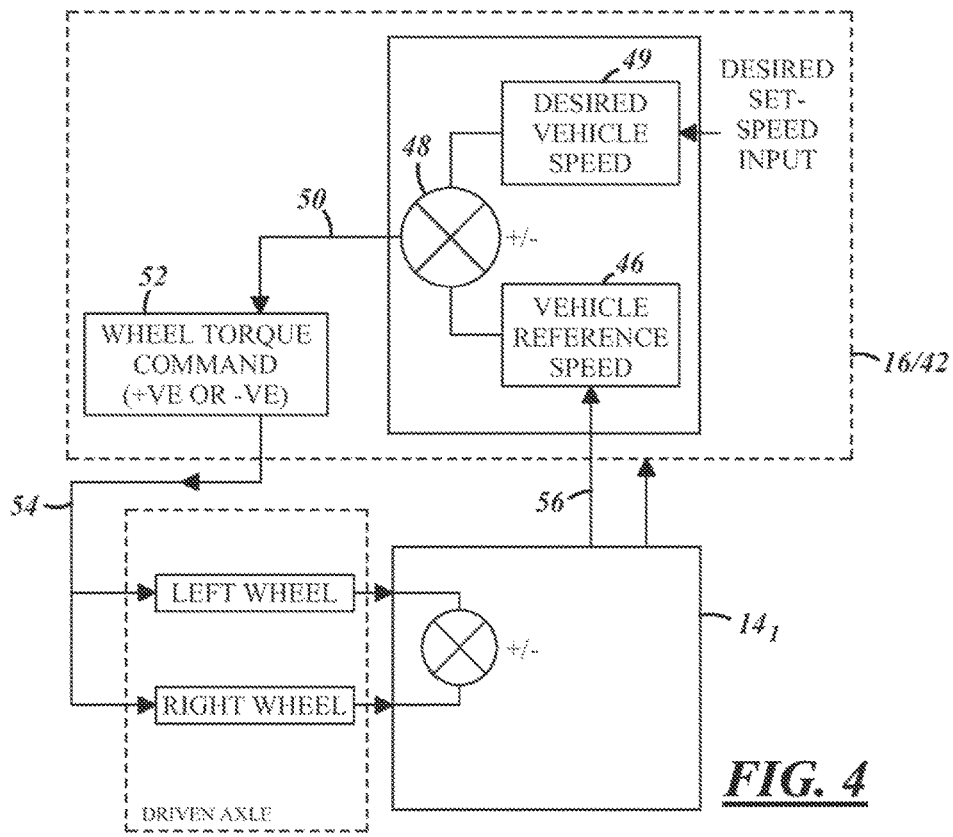
FIG. 4 is a schematic and block diagram illustrating the operation of a speed control system of a vehicle, such as the vehicle illustrated in FIGS. 1 and 2.

More particularly, and with reference to FIG. 4, once the desired set-speed is determined, a vehicle speed sensor (identified as sensor 14, in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs to be increased or decreased to maintain or achieve the desired set-speed. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels or that a braking force is applied to the vehicle wheels, either or both of which may be used to implement the change in torque that is necessary to achieve or maintain the desired vehicle set-speed. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment. LSP control system 28 may be further configured to detect, sense, or otherwise determine information relating to the terrain over which vehicle 10 is traveling (e.g., terrain type, surface classification, terrain roughness, etc.). In accordance with one embodiment, VCU 16, may be configured to perform this function and to do so in a number of ways. One such way is that described in UK Published Application No. GB2492748A published on 16 Jan. 2013, the entire contents of which is incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of the terrain and, in certain instances, one or more characteristics thereof, such as, for example, the roughness of the terrain.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is traveling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity. ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In one embodiment, and in addition to the estimator module, a road roughness module may also be included for calculating the terrain roughness based on air suspension sensors (the ride height sensors) and wheel accelerometers. In such an embodiment, a terrain indicator signal in the form of a roughness output signal is output from the road roughness module.

In any event, the estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is traveling, for further processing by VCU 16. For example, the terrain indicators may be used to determine which of a plurality of vehicle subsystem control modes (e.g., terrain modes) is most appropriate based on the indicators of the type of terrain over which the vehicle is traveling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), chassis management subsystem $12_2$, or another suitable component may be appropriately configured to do so, and such other embodiments remain within the spirit and scope of the present disclosure. Further, it should be appreciated that the foregoing description of the arrangement, functionality, and capability of LSP control system 28 has been provided for purposes of example or illustration only and is not meant to be limiting in nature. Accordingly, LSP control system 28 is not intended to be limited to any one particular embodiment or arrangement.

Once again, the preceding description of vehicle 10 and the illustrations in FIGS. 1 and 2 are only intended to illustrate one potential vehicle arrangement and do so in a general way. Any number of other vehicle arrangements and architectures, including those that differ significantly from the one shown in FIGS. 1 and 2, may be used instead.

Figure 5:
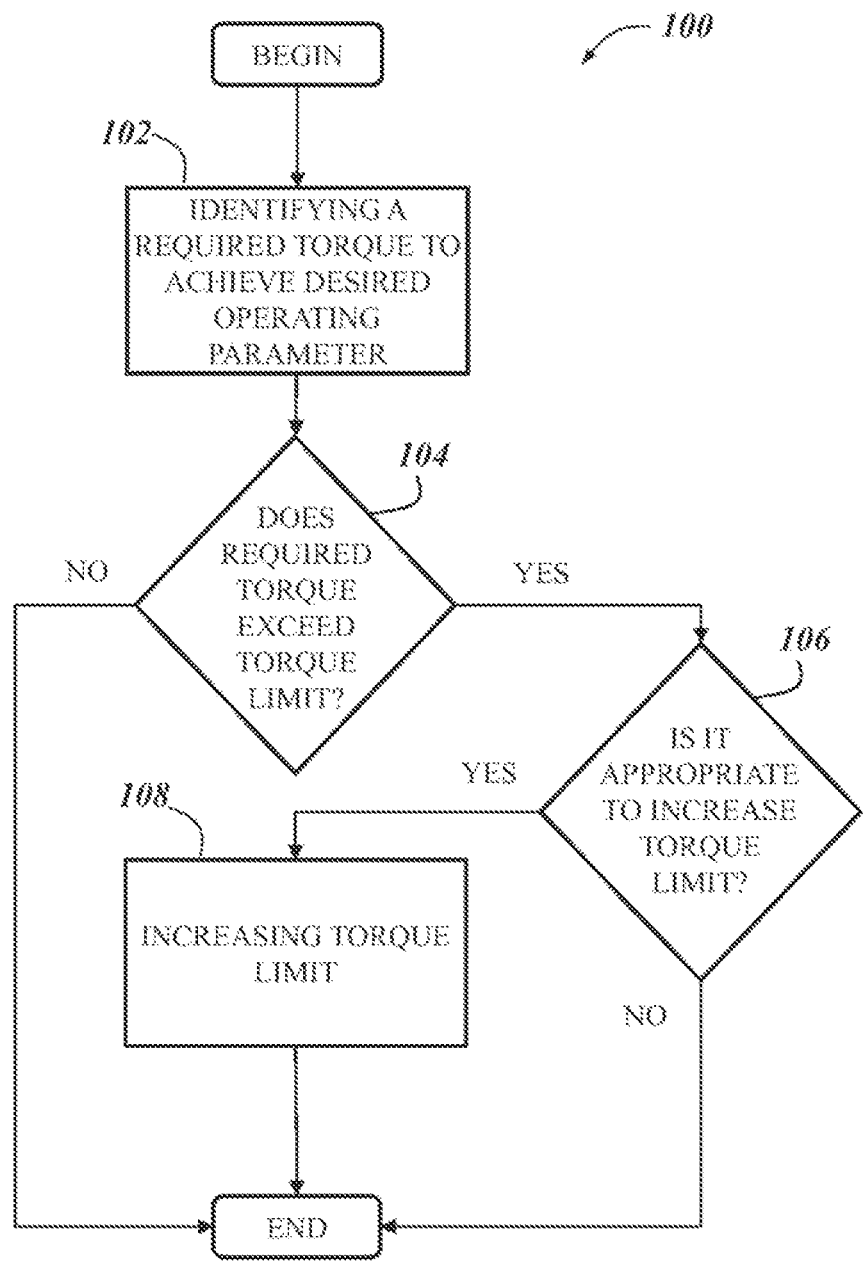
FIGS. 5 and 6 are flow diagrams of alternate embodiments of a method for operating a speed control system of a vehicle, such as the vehicle illustrated in FIGS. 1 and 2.

Turning now to FIG. 5, there is shown a method 100 for operating a speed control system to control the speed of a vehicle. For purposes of illustration and clarity, method 100 will be described in the context of vehicle 10 illustrated in FIGS. 1 and 2 and described above, and more specifically, the low-speed progress (LSP) control system 28 thereof, in particular (which, in an embodiment, is integrated in VCU 16 (i.e., VCU 16 comprises ECU 42 of speed control system 28). It will be appreciated, however, that the application of the present methodology is not meant to be limited solely to such an arrangement, but rather method 100 may find application with any number of other vehicles and/or speed control system arrangements, including, for example, LSP control systems other than that described above (e.g., not integrated into the VCU of a vehicle, and/or the VCU does not comprise the ECU of the LSP control system), as well as, in certain instances, conventional "on-highway" or "on-road" cruise control systems, such as, for example, cruise control system 26 described above. Accordingly, the present disclosure is not meant to be limited to any one particular arrangement or type of speed control system. It will be further appreciated that the performance of method 100 is not meant to be limited to one particular order or sequence of steps.

Additionally, in one embodiment, the need, and therefore the performance of, the present method may be precipitated by a number of circumstances. As described above, in conventional speed control systems, a default limit on the amount of powertrain output torque that the system may command be generated and applied to achieve (e.g., reach or maintain) a desired vehicle speed is imposed. As such, at no time during the operation or use of the speed control system may torque that exceeds the default torque limit be commanded or requested from the powertrain subsystem. This limit is typically a percentage of the maximum output torque capacity of the powertrain subsystem, and may be on the order of 70-80% (e.g., the speed control system can only command torque up to 70-80% of the maximum powertrain capacity). In off-road driving scenarios, this may be particularly problematic in that varying and large amounts of torque may be required in order to maintain a desired speed while traversing various, and sometimes rather extreme, terrain conditions (e.g., gradients, boulders, water, gravel, and sand, to cite a few), albeit at rather low speeds. In view of this and potentially a confluence of other factors and conditions relating to, for example, the particular configuration of the vehicle, a powertrain output torque that exceeds the predetermined torque limit may be necessary in order to allow the speed control system to optimally function and to permit the vehicle to progress in accordance with the demands of the user, while at the same time maintaining vehicle composure and driver comfort. Accordingly, there may be instances in which the vehicle is traveling using the speed control system and it is both necessary and appropriate to temporarily increase the torque limit imposed on the speed control system.

To that end, and with reference to FIG. 5, in one embodiment, method 100 comprises a step 102 of identifying a powertrain output torque that is required to achieve a desired operating parameter of the vehicle. In one embodiment, the operating parameter comprises a desired vehicle speed that corresponds to a particular speed control system set-speed. In such an embodiment, step 102 comprises determining the torque required to achieve (e.g. reach or maintain) the desired vehicle speed, or to otherwise maintain adequate vehicle progress, while traversing the prevailing terrain. The required torque may be determined in a number of ways known in the art. For example, in one embodiment, the required torque may be determined utilizing an acceleration curve. In such an instance, and in general terms, the required torque may represent an increased torque value that is based on an incremental torque increase sufficient to accelerate the vehicle along a prescribed acceleration curve in order to maintain the desired speed. This value may be further adjusted based on operating conditions relating to the vehicle (e.g., the drag and gradient experienced by the vehicle). It will be appreciated that this particular torque determining technique is just one of many that may be used, and so the present disclosure is not intended to be limited to any particular technique. In one embodiment, step 102 may be performed by VCU 16 of vehicle 10, and in certain instances, VCU 16 along with input from subsystems 12 and/or vehicle sensors 14.

Once the required torque is determined in step 102, method 100 comprises a step 104 of assessing whether the required torque exceeds a predetermined torque limit of the speed control system. As described above, the predetermined torque limit is a default maximum torque limit of the speed control system that is imposed whenever the system is in use, and which may be based on a particular percentage of the maximum output torque capacity of the powertrain subsystem of the vehicle. Step 104 may be performed by comparing the required torque with the toque limit, using, for example, a comparator or other suitable means, and then determining whether the requested torque exceeds the torque limit. In one embodiment, step 104 may be performed by VCU 16 or another suitable component.

If it is determined in step 104 that the required torque does not exceed the torque limit, the method may end and the speed control system may continue to monitor the operation of the vehicle. If, however, it is determined that the required torque does exceed the limit, method 100 may include a step 106 of determining whether it is appropriate or permissible to temporarily raise or increase the torque limit to allow the speed control system to command or request the required torque. In one embodiment, step 106 comprises evaluating one or more predetermined conditions or criteria to make this determination. If it is determined that the necessary criteria are met, which may require that all of the evaluated criteria be met, or alternatively, that at least certain ones of the evaluated criteria are met, the further determination that an increase in the torque limit is appropriate or permissible may be made. Any number of criteria may be utilized in making the required determination in step 106 including, but not limited to, one or more of those described below. In one embodiment, VCU 16 may be configured to perform step 106 either alone or in combination with one or more other suitable components.

One criterion that, if met, may indicate that an increase in the torque limit is appropriate or permissible, is that the current speed of the vehicle is less than the desired set-speed (which may be the lower of a user-defined set-speed and a maximum set-speed imposed by the system). In accordance with one embodiment, VCU 16 may obtain the current vehicle speed from one or more subsystems 12 (e.g., powertrain subsystem $12_1$) and/or vehicle sensors 14 (e.g., vehicle speed sensor), or calculate it using information obtained or received from one or more of either subsystems 12 and/or vehicle sensors 14 (e.g., wheel speed sensors, etc.). In any event, VCU 16 may compare the current speed with the desired set-speed, using, for example, a comparator or another suitable technique, to determine whether it is less than the desired set-speed, and when it is, to further determine that the criteria has been met.

Another criterion is that the current powertrain output torque is at the predetermined torque limit. Similar to the criterion above, in one embodiment, VCU 16 may obtain the current torque from one or more subsystems 12 (e.g., powertrain subsystem $12_1$) and/or vehicle sensors 14 (e.g., engine torque sensor), or calculate it using information obtained or received from one or more of either subsystems 12 and/or vehicle sensors 14. In any event, VCU 16 may compare the current torque with the torque limit using, for example, a comparator or another suitable technique, to determine whether it is at or below the torque limit, and when it is at the limit, to further determine that the criteria has been met.

Yet another criterion is that the speed control system has been in use with the powertrain torque at the torque limit for a predetermined period of time and/or number of vehicle powertrain (e.g., engine or motor) revolutions. In one embodiment, VCU 16 may evaluate this criterion using information relating to the powertrain output torque that was previously received and stored in a memory device, such as, for example, memory 22 or another suitable device, as well as current information received from one or more of subsystems 12 (e.g., powertrain subsystem 12$_1$) and/or sensors 14 (e.g., engine torque sensor). Using this information, VCU 16 is configured to determine if the criteria is met. For example, VCU 16 may look back at the torque readings taken during the predetermined period of time (e.g., 5 s) or over the predetermined number of powertrain revolutions stored in memory 22, and see if the torque has been constantly at the torque limit. If so, VCU 16 may determine that the criteria has been met.

Yet still another criterion is that there has been no intervention on the part of the user or the vehicle to manually reduce the speed of the vehicle or the torque output of the powertrain subsystem. This may include, for example, determining whether the user has attempted to apply or activate the vehicle brakes. In such an instance, VCU 16 may obtain information from brake subsystem 12$_3$ and/or directly from one or more of sensors 14 (e.g., brake pedal sensor) to make a determination as to whether the user has attempted or is attempting to activate the vehicle brakes (e.g., by pressing brake pedal 18). If it is determined that the user has not done so, or is not currently doing so, VCU 16 may further determine that the criteria is met. In addition to or instead of evaluating the status of the brake system in the manner above, the evaluation of this criterion may also involve evaluating other sources of user/vehicle intervention. One such source is the speed control system itself. More particularly, if VCU 16 determines that the user has attempted to, or is currently attempting to, reduce the set-speed (e.g., using one of user interface devices 44, such as "−" button 44$_3$, or, in certain embodiments, brake pedal 18), deactivate or suspend operation of the system (e.g., using "cancel" button 44$_4$), and/or try to activate the system while already active (which may indicate a user's desire to deactivate the system), it may determine that the user is intervening, and may then further determine that the criteria is not met. The evaluation may additionally or alternatively comprise determining whether another component, module, or subsystem of the vehicle capable of limiting vehicle movement is active. For example, VCU 16 may evaluate whether hill descent control (HDC) or some other like system is active, and if so, to determine that this criteria is not met.

A somewhat related criterion relates to the operational status of the vehicle brake subsystem. More particularly, the criterion is that the brake subsystem is operating correctly, and may also require that it has been primed. In one embodiment, VCU 16 may obtain the relevant information from brake subsystem 12$_3$, and may then use that information to determine if the criterion is met. Accordingly, if VCU 16 determines that the brake system is operating correctly, it may further determine that the criterion is met.

The steering angle being below a predetermined threshold angle is another criterion that may be evaluated. In such an instance, VCU 16 may acquire or obtain the current steering angle from, for example, steering subsystem 12$_5$ and/or one or more of vehicle sensors 14 identified above (e.g., steering angle sensor). It may then compare the current steering angle with a predetermined threshold angle using, for example, a comparator or another suitable technique, to determine whether it is less than the threshold angle. When it is determined that the steering angle is less than the threshold angle, VCU 16 may further determine that the criterion has been met.

Another criterion that may be evaluated is applicable to situations where the vehicle is traveling down a gradient. More particularly, a criterion that the vehicle is not traveling down a gradient and that sufficient negative torque cannot be applied to maintain vehicle composure (e.g., the system does not allow the vehicle speed to accelerate up to the desired set-speed at a rate higher than a value falling within a given acceleration corridor (e.g., 0.1-0.2 g) and does not allow vehicle speed to increase above the user set-speed, i.e., to overshoot vehicle set-speed). This criterion may be evaluated in a number of ways. In one embodiment, VCU 16 may acquire information relating to the attitude of the vehicle from, for example, chassis management subsystem 12$_2$ and/or one or more of vehicle sensors 14 (e.g., gyro sensors or gradient sensors) and use it to calculate whether brake torque applied by the braking subsystem 12$_3$ would be sufficient to compensate for powertrain overrun and still maintain vehicle composure if grip to one or more wheels of the vehicle is subsequently restored to a nominal value and/or drag experienced by one or more wheels is subsequently reduced to a nominal value. VCU 16 may make this determination on the basis that the gradient currently experienced by the vehicle is retained when grip is restored or drag relieved. If VCU 16 determines that sufficient negative torque cannot be applied to maintain composure in such circumstances, it may deem the criteria not met while the vehicle is traveling downhill.

In certain instances, another criterion may be that the vehicle is wading. In such circumstances it may be beneficial to increase the torque limit to increase the amount of exhaust gas passing through an aftertreatment system of the powertrain subsystem and reduce the risk that the liquid (water) through which the vehicle is wading will enter the aftertreatment system and cause damage thereto (e.g., catalytic converters and/or particulate filters associated with aftertreatment systems may be particularly vulnerable to damage due to exposure when wading). Accordingly, in one embodiment, VCU 16 may be configured to receive or acquire information from one or more subsystems 12 and/or one or more vehicle sensors 14 that indicates or allows VCU 16 to determine that the vehicle is wading. If VCU 16 determines that the vehicle is, in fact, wading, it may determine that this criterion is met. In this scenario, VCU 16 may additionally be arranged to manage or otherwise prevent unwanted deviation from the set-speed due to such a torque increase by proportionately increasing brake torque and/or making appropriate adjustments to the driveline gear ratio.

A further criterion that may be evaluated relates to the particular operating mode of the vehicle. More particularly, the criterion may be that the vehicle is operating in a particular mode, or in one of a number of prescribed modes. In one embodiment, the mode is one relating to terrain. Specifically, a vehicle may be configured to operate in a number of different terrain modes that correspond to different types or natures of terrain. In one embodiment, only certain of these modes may be appropriate for allowing an increase in the torque limit. For example, if the existing terrain mode corresponds to driving on a relatively slippery surface (e.g., snow or ice), an increase in the torque limit may not be advisable and, as such, may be prohibited for that mode. In accordance with one embodiment, VCU 16 may be configured to control/manage the terrain modes of operation, and therefore, may be able to easily determine the existing mode, and thus, to determine whether it is one for which an increase in torque limit is allowable. If VCU 16 determines that an increase in the torque limit is permissible in the current mode, it may further determine that the criterion is met.

While certain criteria have been specifically described above, it will be appreciated that the present disclosure is not meant to be so limited. Rather, any number of criteria in addition to or instead of those described above may be utilized alone or in combination with other criteria, and thus, the present disclosure is not limited to any particular criteria.

As illustrated in FIG. 5, if it is determined in step 104 that an increase in the torque limit would be permissible or appropriate, method 100 may comprise a step 108 of increasing the torque limit at least temporarily to allow the speed control system to command the powertrain subsystem to apply the required torque. In an instance where the torque limit is increased, it may do so until it is determined that it is no longer necessary or permissible, and the torque limit may then be reset and not increased again until the requirements described above are once again met. In one embodiment, VCU 16 is configured to perform step 108.

In certain instances, while an increase in the torque limit may be permitted, a limit may be placed on an allowed rate of increase of the torque actually applied by the powertrain subsystem. For example, if it is determined, using the terrain sensing/detecting techniques described above or another suitable technique, that the vehicle is operating on a slippery surface but that an increase in the torque limit is desirable, the increase may be permitted subject to a limitation with respect to the rate of increase of applied torque and/or the increased torque limit. Moreover, in certain embodiments, the particular amount that the torque limit is increased may be dictated by various factors. One such factor relates to the terrain over which the vehicle is traveling. For example, the amount of increase may be influenced by a pre-set performance characteristic dictated by a terrain response subsystem of the vehicle. The amount of increase may also be dependent upon the particular mode of operation of the vehicle (e.g., the particular terrain mode), and/or a change or predicted change in that mode. Accordingly, it will be appreciated that any number of factors may be considered in determining how much to increase the torque limit once it is determined that it is appropriate to do so, and the present disclosure is not limited to the use of any particular factors. In one embodiment, the functionality described above may be performed by VCU 16.

Even in instances where the torque limit is increased, the increase may not necessarily remain fixed or constant; rather it may be adjusted downward as the need for the increase is reduced, or potentially upwards when the need is increased. More particularly, in one embodiment, the magnitude or value of the increased torque limit may be reduced in dependence on a determination by the speed control system, or another suitable component of the vehicle, that the rate of vehicle acceleration has exceeded a prescribed threshold value. Such a limit on the increase of the torque limit may be advantageous in enhancing the composure of the vehicle. Accordingly, in one embodiment, method 100 may further comprise the step (not shown) of monitoring one or more operating parameters of the vehicle (e.g., the rate of acceleration of the vehicle) and adjusting the increased torque limit based thereon (e.g., reducing the limit when the rate of acceleration is greater than a prescribed threshold). In accordance with one embodiment, VCU 16 is configured to perform this functionality. As such, VCU 16 may acquire information relating to the vehicle parameter of interest, from one or more of vehicle subsystems 12 and/or one or more of vehicle sensors 14, and then evaluate the parameter in view of the predetermined threshold. For example, in instance wherein the rate of acceleration is the parameter of interest, VCU 16 may acquire information relating to the rate of acceleration of the vehicle from one or more of vehicle subsystems 12 and/or vehicle sensors 14 and then compare the rate of acceleration of the vehicle with the prescribed threshold. If VCU determines that that the rate of acceleration is below the threshold, the torque limit may be left unchanged; otherwise, it may be reduced accordingly. For example, in an embodiment, VCU 16 may be arranged to collect vehicle acceleration data from vehicle sensors 14 in the form of an inertial measurement unit (IMU), not shown. Data from the IMU may be used by VCU 16 as a way to ascertain whether vehicle 10 is moving/accelerating as intended given the torque applied to the wheels as commanded by VCU 16. From there, then, it may be determined if additional torque is needed in order to elicit the desired vehicle response, and in what amount. It will be appreciated that while rate of acceleration is the only parameter that has been described with respect to this functionality, any number of parameters may be evaluated and used instead of rate of acceleration, such as, for example, rate of change in the torque limit increase. As such, the present disclosure is not limited to the use of any particular parameters.

Similar to the description above, in certain instances, it may be desirable to gradually increase the torque limit as needed. More particularly, when it is appropriate to do so, the speed control system may be configured to increase the torque limit in a filtered or gradual manner so as to avoid unnecessarily causing or exacerbating a slip event or unnecessary erosion of the terrain over which the vehicle is traveling, which may occur if too much torque is applied. As such, the torque limit may be a fluid limit that is gradually increased as the demand for torque increases, but not unnecessarily so. Accordingly, the torque limit may be increased and managed in any number of ways or using any number of schemes, and the present disclosure is not limited to any particular way or scheme for doing so.

Figure 6:
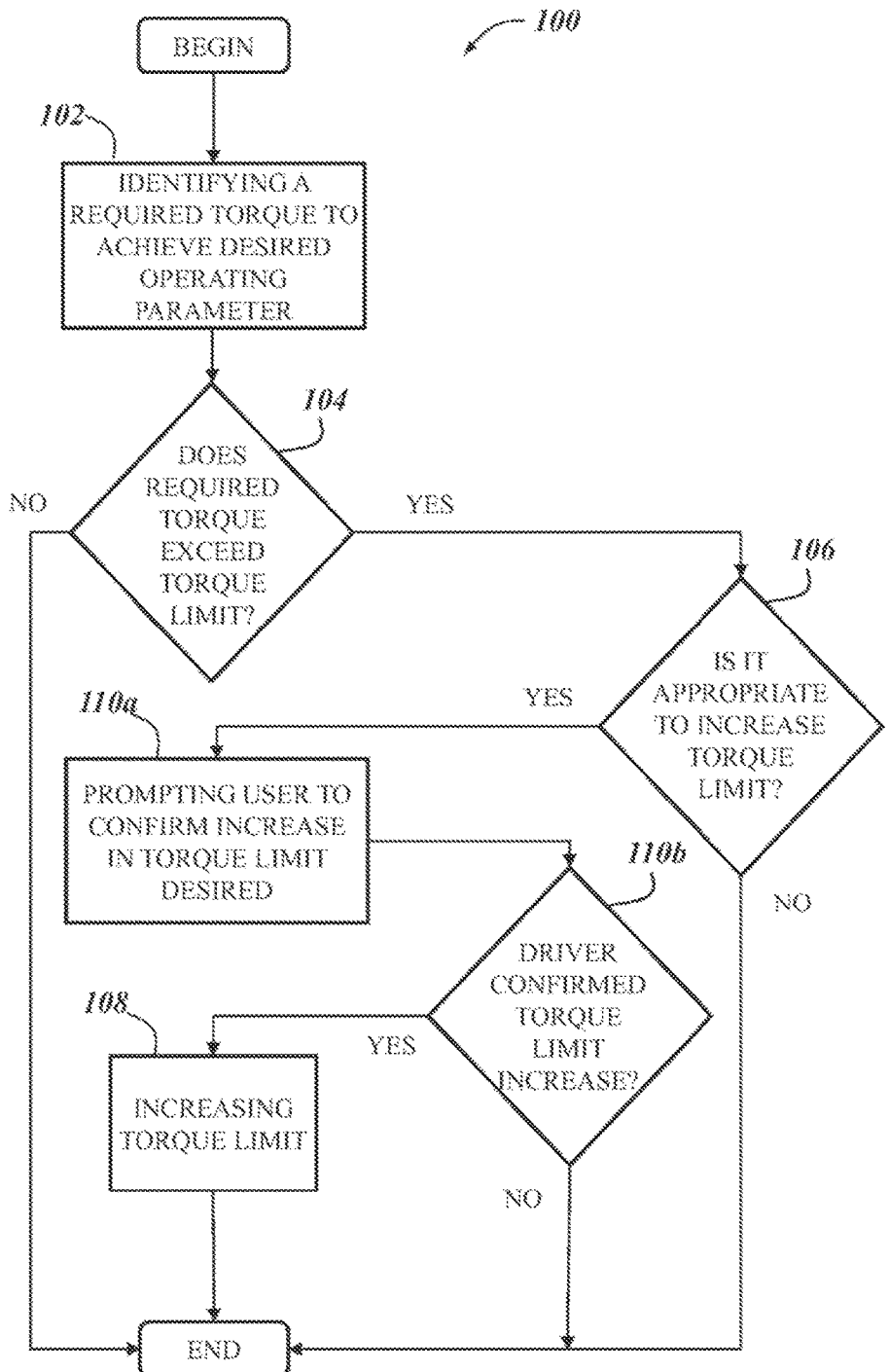

With reference to FIG. 6, another embodiment of method 100 is illustrated that allows for certain user interaction or input with respect to whether the torque limit is increased even though it may be deemed appropriate or permissible to do so by the speed control system. More particularly, in one embodiment, and following a determination in step 106 that it is appropriate to increase the torque limit, but before the limit is actually increased in step 108, method 100 may further comprise a step 110 of confirming that the user desires to increase the torque limit. More particularly, in one embodiment, method 100 may include a step 110a of displaying a user notification on, for example, a suitably configured user interface device advising the user that the required torque exceeds the predetermined system torque limit and prompting him to confirm that the torque limit should be increased. In a step 110b, a determination is made as to whether the user confirmed that the torque limit should be increased, and if so, the method proceeds to step 108 of increasing the torque limit; otherwise, the method ends and the torque limit remains unchanged. One reason for including such functionality is to enable the user to make an informed choice as to whether to change the route he is traveling, to manually intervene, or to permit the speed control system to manage negotiation of the situation by raising the torque limit. Accordingly, in one embodiment, VCU 16, or another suitable component, may be configured to generate a notification that may be displayed audibly and/or visually on an appropriately configured user interface device 44 in close proximity to the user. In response, the user may confirm that the torque limit should be increased by manipulating the same or a different user interface device 44. Depending on the nature of the user's input, the method may proceed to step 108 of increasing the torque limit, or alternatively may end.

In another embodiment, and similar to that described above, following a determination in step 106 that a torque limit increase is not appropriate, method 100 may include a step (not shown) of displaying a user notification on, for example, an appropriately configured user interface device advising the user that the desired set-speed (or another desired operating parameter) cannot be met due to the torque limit and prompting him to indicate whether the speed control system should be deactivated. A determination is then made as to whether the user indicated that the system should be deactivated, and if so, operation of the system is either suspended or deactivated and the method ends. One reason for providing this option is to permit the user to manually increase the torque output above that which is permitted during operation of the speed control system (i.e., when the speed control system is deactivated, there is no default torque limit imposed). In one embodiment, this step may be performed by VCU 16 and/or VCU 16 in conjunction with one or more user interface devices 44, or another suitable component.

Figure 7:
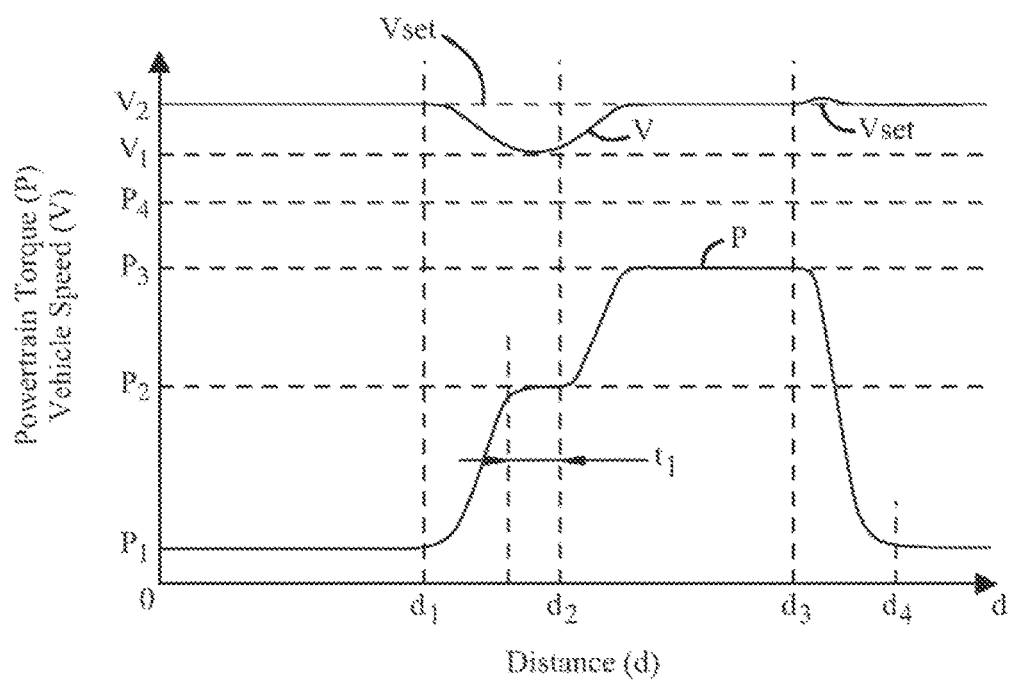
FIG. 7 is a graphical representation illustrating powertrain output torque, vehicle speed, and speed control system set-speed as a function of distance that corresponds to a vehicle during a portion of a particular off-road journey.
Figure 8:
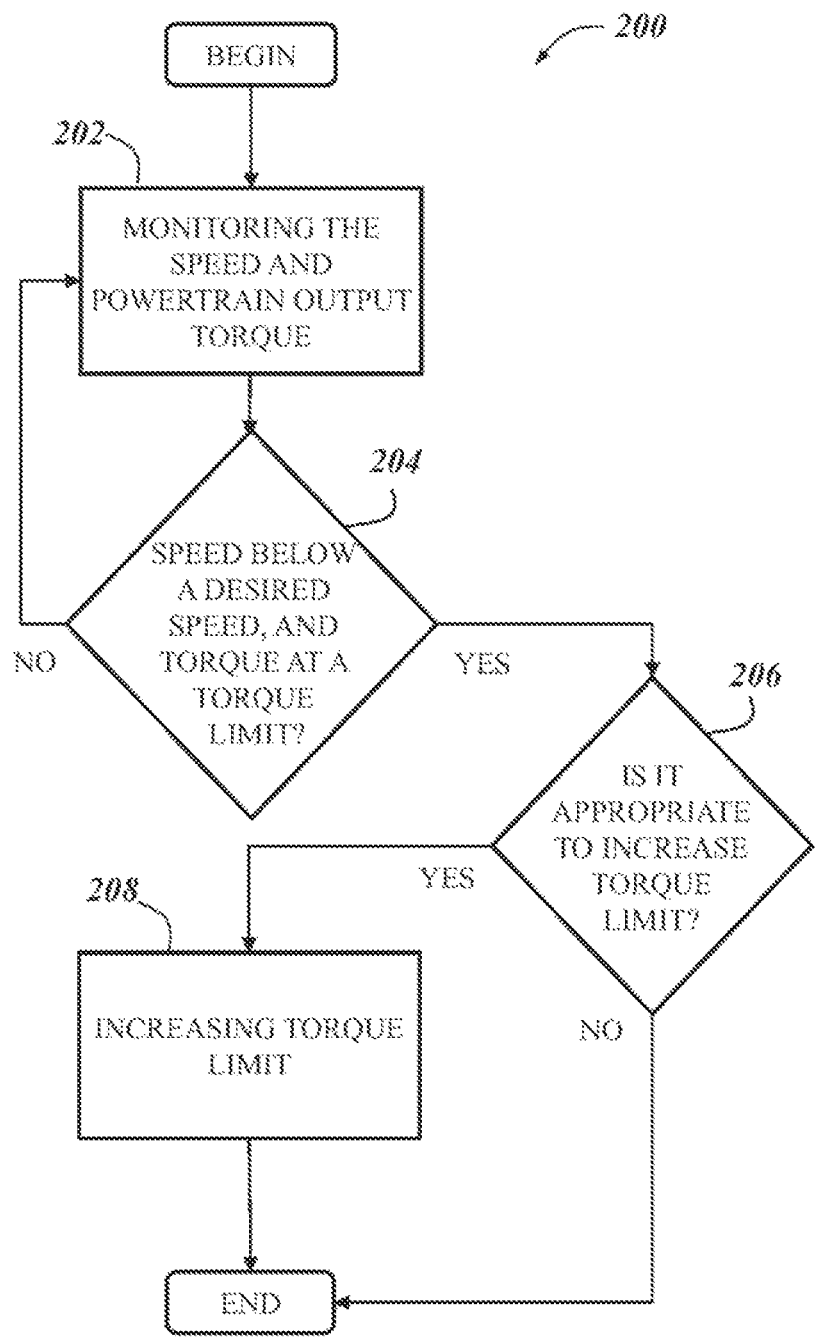
FIG. 8 is a flow diagram of the operation of the speed control system of the vehicle to which the example illustrated in FIG. 7 applies.

With reference to FIGS. 7 and 8, and for purposes of illustration only, an example of an implementation of the present method (method 200 in FIG. 8) and system will now be provided. In this particular implementation, vehicle 10 is traveling under the control of LSP control system 28 (e.g., VCU 16). As shown in FIG. 7, as vehicle 10 travels up to a distance of $d=d_1$ from a reference location ($d=0$), the powertrain subsystem $12_1$ develops an amount of output torque $P=P_1$ in order to maintain a set-speed ("$V_{set}$") $V=V_{set}=V_2$.

As vehicle 10 moves beyond distance $d=d_1$, it encounters sandy terrain and, as a result, an amount of drag on the vehicle is increased. System 28 detects this increase in drag at least in part due to a decrease in the vehicle speed, V. Accordingly, system 28 commands an increase in the amount of torque being supplied by powertrain subsystem $12_1$ to restore the vehicle speed to the set-speed, $V_{set}$. In the illustrated embodiment, this increased torque is represented by $P=P_2$, which corresponds to the default maximum allowable powertrain output torque that may be commanded by system 28 (i.e., the torque limit imposed when system 28 is in operation). As vehicle 10 continues to progress, system 28 continues to monitor the vehicle speed (step 202 in FIG. 8) and eventually detects that the vehicle speed has fallen to speed $V=V_1$, which is less than the set-speed, $V_{set}$ (i.e., $V=V_1<V_{set}$). The system 28 holds the powertrain output torque at $P_2$ for a prescribed period of time, which, for purposes of example only is five seconds (5 s). After 5 s have elapsed, vehicle is now at distance $d=d_2$ from the reference location and is still traveling at a speed of $V<V_{set}$, accordingly a determination is made that vehicle 10 is traveling below the desired set-speed and the output torque is at the torque limit (step 204 in FIG. 8). In this particular implementation, system 28 further confirms that after the prescribed period of time has elapsed, the user has not depressed the accelerator pedal 20 or the brake pedal 18 in an attempt to intervene in vehicle progress control and, in the illustrated implementation, determines that an increase in powertrain output torque above the torque limit of $P_2$ is appropriate or permissible (step 206 in FIG. 8).

Accordingly, system 28 determines that an increase in powertrain output torque up to a value of $P_4$ is permissible, and begins to cause the powertrain output torque to increase, thereby increasing the torque limit (step 208 in FIG. 8). As the powertrain output torque is increased, system 28 monitors the vehicle speed and controls vehicle 10 to achieve the user set-speed of $V=V_{set}$. In the implementation shown in FIG. 7, vehicle 10 achieves the user set-speed $V=V_{set}$, and maintains this speed with a powertrain output torque of $P=P_3<P_4$.

At distance of $d=d_3$, the leading wheels of vehicle 10 leave the sandy terrain and encounter a relatively hard surface having a relatively low rolling resistance and relatively high coefficient of surface friction. System 28 determines that vehicle speed is now increasing relatively abruptly and commands a reduction in powertrain output torque in order to maintain the vehicle speed $V=V_3$. In an attempt to prevent excessive overshoot of $V_{set}$ while the powertrain torque is being reduced, system 28 also commands application of brake subsystem $12_3$ to one or more leading wheels of vehicle 10. It is to be understood that the brake subsystem is employed because it is capable of a much faster response to torque commands than powertrain subsystem $12_1$ due to rotational inertia of the powertrain and is, therefore, well placed to limit set-speed overshoot when moving from high to low drag surfaces, for example.

At a distance $d=d_4$, the amount of powertrain output torque has reduced back to a value of around $P_1$ being sufficient to maintain the vehicle speed at the set-speed (i.e., $V=V_{set}=V_2$) over the terrain encountered at $d>d_4$.

It will be appreciated in view of the above that a benefit of the present system and method is that rather than being restricted by an artificially imposed torque limit when in use, the speed control system and method for operating the same allow for the imposed torque limit to be increased in certain instances where various conditions or circumstances dictate that it is permissible or appropriate to do so. By permitting the torque limit to be increased, powertrain output torque that is required for the vehicle to adequately maintain progress, but that also exceeds the default torque limit, may be commanded and applied. As such, vehicle progress and composure, as well as occupant comfort may be maintained solely by the speed control system without requiring manual intervention by the user to do so.

It is to be understood that the foregoing description is not a definition of the invention, but is a description of one or more preferred embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method for operating a cruise control system of a vehicle, comprising:
imposing a maximum positive torque limit having a fixed value upon activation of the cruise control system, wherein the cruise control system varies application of torque to maintain a set speed while in an active state;
identifying a torque required to achieve a desired set speed;
assessing whether the required torque exceeds the fixed value of the maximum positive torque limit of the cruise control system;
when the required torque exceeds the fixed value of the maximum positive torque limit, determining if it is appropriate to temporarily increase the maximum positive torque limit above the fixed value, wherein determining if it is appropriate to increase the maximum positive torque limit comprises evaluating one or more criteria, the one or more criteria relating to a vehicle configuration or vehicle operation;
when at least one of the one or more criteria are met, temporarily increasing the maximum positive torque limit above the fixed value while maintaining the cruise control in the active state, and thereafter reducing the maximum positive torque limit back to the fixed value when either (a) the required torque no longer exceeds the fixed value or (b) the one or more criteria are no longer met; and
when the at least one of the one or more criteria are not met, maintaining the imposed maximum positive torque limit at the fixed value.

2. The method of claim 1, wherein the cruise control system is a low-speed progress control system.

3. The method of claim 1, wherein the one or more criteria comprise one or more of:
a current speed of the vehicle is less than a desired speed;
a current powertrain output torque is at the predetermined maximum positive torque limit;
the speed control system is active with the powertrain output torque at the predetermined maximum positive torque limit for a predetermined period of time or a number of revolutions of a powertrain of the vehicle;
no user intervention to reduce a speed of the vehicle or the powertrain output torque is present;
no system for limiting movement of the vehicle is active;
a steering angle is below a predetermined threshold;
the vehicle is not traveling down a gradient and sufficient negative torque cannot be applied to maintain vehicle composure;
a brake system is operating correctly and has been primed;
the vehicle is traveling over a particular type of terrain; and
the vehicle is wading in water.

4. The method of claim 1, further comprising:
displaying a user notification that the required torque exceeds the predetermined maximum positive torque limit, and
prompting the user to confirm that torque limit should be increased, wherein the torque limit is increased only in response to a user indication to do so.

5. The method of claim 1, wherein when it is determined that it is not appropriate to increase the predetermined maximum positive torque limit, the method comprises:
displaying a user notification that the desired operating parameter cannot be met; and
prompting the user to indicate whether the speed control system should be deactivated.

6. The method of claim 1, wherein when the predetermined maximum positive torque limit has been increased, the method comprises:
monitoring one or more operating parameters of the vehicle; and
adjusting the increased torque limit based on the one or more operating parameters.

7. The method of claim 6, wherein one or more operating parameters comprises monitoring the rate of acceleration of the vehicle, and the adjusting step comprises reducing the increased torque limit when the rate of acceleration of the vehicle exceeds a predetermined threshold.

8. The method of claim 1, wherein the desired operating parameter comprises a desired speed of the vehicle.

9. A method for operating a cruise control system of a vehicle, comprising:
imposing a maximum positive torque limit having a fixed value upon activation of the cruise control system, wherein the cruise control system varies application of torque to maintain a desired speed while in an active state;
monitoring a speed and a powertrain output torque of the vehicle to maintain the desired speed in the active state;
when the speed of the vehicle falls below the desired speed, and the powertrain output torque has met the maximum positive torque limit of the speed control system, determining if it is appropriate for the output torque to temporarily exceed the fixed value of the maximum positive torque limit, wherein determining if it is appropriate to increase the torque limit comprises evaluating one or more criteria;
when at least one of the one or more criteria are met, temporarily increasing the powertrain output torque to a level at which the desired vehicle speed is achieved while maintaining the cruise control in the active state, and thereafter reducing the maximum positive torque limit back to the fixed value when either (a) the required torque no longer exceeds the fixed value or (b) the one or more criteria are no longer met; and
when the at least one of the one or more criteria are not met, maintaining the imposed maximum positive torque limit at the fixed value.

10. The method of claim 9, wherein the cruise control system is a low-speed progress control system.

11. The method of claim 9, wherein the one or more criteria comprise one or more of:
the speed control system is active with the powertrain output torque at the predetermined maximum positive torque limit for a predetermined period of time or a number of revolutions of an engine of the vehicle;
no user intervention to reduce the speed of the vehicle or the powertrain output torque is present;
no system for limiting movement of the vehicle is active;
a steering angle is below a predetermined threshold;
the vehicle is not traveling down a gradient and sufficient negative torque cannot be applied to maintain vehicle composure;
a brake system is operating correctly and has been primed;
the vehicle is traveling over a particular type of terrain; and
the vehicle is wading in water.

12. A cruise control system for a vehicle, comprising:
an electronic control unit, configured to:
- impose a maximum positive torque limit having a fixed value upon activation of the cruise control system, wherein the cruise control system varies application of torque to maintain a set speed while in an active state;
- determine a torque required to achieve a desired set speed;
- assess whether the required torque exceeds the fixed value of the maximum positive torque limit of the cruise control system;
- when the required torque exceeds the fixed value of the maximum positive torque limit, determine if it is appropriate to temporarily increase the maximum positive torque limit above the fixed value, wherein determining if it is appropriate to increase the maximum positive torque limit comprises evaluating one or more criteria, the one or more criteria relating to a vehicle configuration or vehicle operation;
- when at least one of the one or more criteria are met, temporarily increase the maximum positive torque limit above the fixed value while maintaining the cruise control in the active state, and thereafter reduce the maximum positive torque limit back to the fixed value when either (a) the required torque no longer exceeds the fixed value or (b) the one or more criteria are no longer met; and
- when the at least one of the one or more criteria are not met, maintain the imposed maximum positive torque limit at the fixed value.

13. The system of claim 12, wherein the cruise control system is a low-speed progress control system.

14. The system of claim 12, wherein the one or more criteria comprise one or more of:
- a current speed of the vehicle is less than a desired speed;
- a current powertrain output torque is at the predetermined maximum positive torque limit;
- the speed control system is active with the powertrain output torque at the predetermined maximum positive torque limit for a predetermined period of time or a number of revolutions of the vehicle engine;
- no user intervention to reduce a speed of the vehicle or the powertrain output torque is present;
- no system for limiting movement of the vehicle is active;
- a steering angle is below a predetermined threshold;
- the vehicle is not traveling down a gradient and sufficient negative torque cannot be applied to maintain vehicle composure;
- a brake system is operating correctly and has been primed;
- the vehicle is traveling over a particular type of terrain; and
- the vehicle is wading in water.

15. The system of claim 12, further comprising a display device, and wherein the electronic control unit is configured to control the display device to display a user notification thereon that the required torque exceeds the predetermined maximum positive torque limit, and prompt the user to confirm that the torque limit should be increased.

16. The system of claim 12, further comprising a display device, and wherein when it is determined that it is not appropriate to increase the predetermined maximum positive torque limit, the electronic control unit is further configured to control the display device to display a user notification that the desired operating parameter cannot be met, and prompt the user to indicate whether the speed control system should be deactivated.

17. The system of claim 12, wherein when the predetermined maximum positive torque limit has been increased, the electronic control unit is further configured to monitor one or more operating parameters of the vehicle, and adjust the increased torque limit based on the one or more operating parameters.

18. The system of claim 17, wherein the electronic control unit is configured to monitor the rate of acceleration of the vehicle, and to adjust the increased torque limit by reducing it when the rate of acceleration of the vehicle exceeds a predetermined threshold.

19. The system of claim 12, wherein the desired operating parameter comprises a desired speed of the vehicle.

20. A vehicle comprising a cruise control system, said cruise control system comprising an electronic control unit, configured to:
- impose a maximum positive torque limit having a fixed value upon activation of the cruise control system, wherein the cruise control system varies application of torque to maintain a set speed while in an active state;
- determine a torque required to achieve a desired set speed;
- assess whether the required torque exceeds the fixed value of the maximum positive torque limit of the cruise control system;
- when the required torque exceeds the fixed value of the maximum positive torque limit, determine if it is appropriate to temporarily increase the maximum positive torque limit above the fixed value, wherein determining if it is appropriate to increase the maximum positive torque limit comprises evaluating one or more criteria, the one or more criteria relating to a vehicle configuration or vehicle operation;
- when at least one of the one or more criteria are met, temporarily increase the maximum positive torque limit above the fixed value while maintaining the cruise control in the active state, and thereafter reduce the maximum positive torque limit back to the fixed value when either (a) the required torque no longer exceeds the fixed value or (b) the one or more criteria are no longer met; and
- when the at least one of the one or more criteria are not met, maintain the imposed maximum positive torque limit at the fixed value.

* * * * *